(12) United States Patent
Yifrah et al.

(10) Patent No.: US 7,261,310 B2
(45) Date of Patent: Aug. 28, 2007

(54) BICYCLE WITH ADJUSTABLE ORIENTATION OF THE SEAT AND THE PEDALS WITH RESPECT TO THE HANDLEBARS

(76) Inventors: Nir Yifrah, 15/10 Lamdan Street, Tel-Aviv (IL) 69414; Lee Golan, 14/86 Korcsh Street, Jerusalem (IL) 94144

( * ) Notice: Subject to any disclaimer, the term of this patent is extended or adjusted under 35 U.S.C. 154(b) by 202 days.

(21) Appl. No.: 10/520,908

(22) PCT Filed: Jul. 10, 2003

(86) PCT No.: PCT/IL03/00570

§ 371 (c)(1), (2), (4) Date: Aug. 3, 2005

(87) PCT Pub. No.: WO2004/007270

PCT Pub. Date: Jan. 22, 2004

(65) Prior Publication Data

US 2005/0285368 A1    Dec. 29, 2005

(30) Foreign Application Priority Data

Jul. 12, 2002  (IL) .................................... 150722

(51) Int. Cl.
*B62K 19/02* (2006.01)
*B62K 3/02* (2006.01)

(52) U.S. Cl. .................. 280/278; 280/287; 280/266; 280/288.4

(58) Field of Classification Search ............ 280/288.4, 280/278, 287, 266
See application file for complete search history.

(56) References Cited

U.S. PATENT DOCUMENTS 3,419,283 A * 12/1968 Newland .................... 280/278
4,659,098 A    4/1987 Jacobson
4,925,203 A    5/1990 Buckler
5,873,590 A    2/1999 Abe et al.
6,799,771 B2 * 10/2004 Bigot ........................ 280/278
2006/0273543 A1 * 12/2006 Jong et al. .................. 280/278
2007/0018422 A1 *  1/2007 Pan ............................ 280/287

FOREIGN PATENT DOCUMENTS

| FR | 2 718 703 | 10/1995 |
| WO | 01/02240 | 1/2001 |
| WO | 01/15963 | 3/2001 |

* cited by examiner

*Primary Examiner*—Lesley D. Morris
*Assistant Examiner*—Marlon Arce-Diaz
(74) *Attorney, Agent, or Firm*—Ladas and Parry LLP (57) ABSTRACT

The invention is a bicycle having adjustable orientation of the seat (6) and the pedals (4) with respect to the handle-bars (5). The bicycle comprising an x shaped frame comprised of a profile (31) and a rigid support member (32) that are rotatably connected to each other by a hollow pin (42). The rider of the bicycle can change the angle between the profile (31) and the rigid support member (32) to rotate about the hollow pin (42). The bicycle further comprises a seat (6), attached to the upper part of the rigid support member (32), a first toothed-wheel (33) attached to the frame (32) by means of a pin passing through the toothed-wheel (33) and the lower part of the rigid support member (32). The pin has a crank and pedal (4) attached to each of its ends. The bicycle also comprises a front gear and second toothed-wheel (7) attached to a pin that passes through the hollow pin (42) located between the seat (6) and the first toothed-wheel (33).

6 Claims, 8 Drawing Sheets

BICYCLE WITH ADJUSTABLE ORIENTATION OF THE SEAT AND THE PEDALS WITH RESPECT TO THE HANDLEBARS

FIELD OF THE INVENTION

The present invention is related to the field of bicycles. More specifically it is related to bicycles in which the position of the seat and the pedals can be changed relative to the fixed handlebars.

BACKGROUND OF THE INVENTION

Any person who has ever ridden a bicycle knows from experience that changing conditions of terrain require different amounts of effort on his part to maintain the forward motion of the bicycle. Generally, on level surfaces we can exert a minimal effort to move along at a reasonable speed, on downhill slopes we "coast", and to go uphill we must exert maximum effort. The rider learns that in order for him to supply different amounts of energy under different circumstances, he must change the position of his body. For example, for traveling steadily at moderate speed on level ground he can sit up straight in the seat, to race along at rapid speeds he leans forward crouched over the handlebars, and to go up a steep hill he gets maximum power by standing up and putting his weight directly above the pedals and even pulling up on the handlebars. Body shifts are also frequently necessary to maintain balance and to reduce wind resistance, in addition to provide varying amounts of power.

Because of their rigid frames, conventional bicycles are not well designed to accommodate the different positions the body assumes during a journey. The rigid positional relationship between the seat, handlebars, and pedals, forces the designers to use average distances between each of these positions depending on the intended use of the bicycle. The result is that the rider often finds himself riding on a bicycle that is not suited to his size or needs and in a physically uncomfortable position that is tiring to maintain.

Recognizing the problems resulting from the rigid frame of conventional bicycles, various solutions have been proposed. Typical of these are the semi-recumbent bicycles disclosed in, for example, U.S. Pat. Nos. 4,659,098 and 4,925,203. In the typical bicycle of this type, the rider sits in a seat with legs stretched out roughly parallel to the ground and with his feet on the pedals, which are located above the front wheel and in front of the handlebars. This design solves some of the problems, but again the frame is fixed and there is no provision for changing the positional relationship between the seat, pedals, and handlebars during travel. In addition, semi-recumbent and recumbent bicycles are associated with many problems resulting from their design that affect the comfort, health, and safety of the rider.

Figure 1:
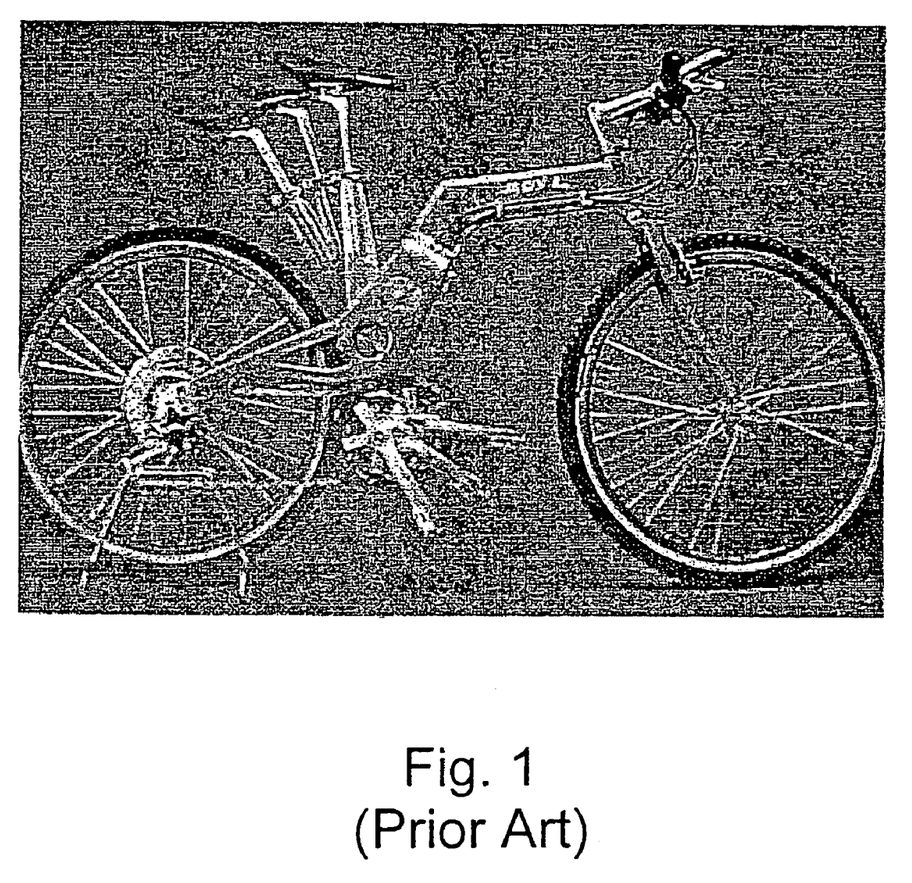
FIG. 1 shows a bicycle of the prior art.

Another approach to overcoming the problems caused by the rigid frame of the conventional bicycle is shown in FIG. 1. In this case the relative position of the seat and pedals can be adjusted, but the amount of adjustment is limited by the ability of the derailleur to adjust the length of the chain as the front gears move closer to and further away from the rear gears. Most importantly, the adjustment can not be carried out while the bicycle is in motion and requires a separate adjustment of the seat in order to keep it parallel with the ground.

It is therefore a purpose of the present invention to provide a bicycle which overcomes the limitations of the prior art and for which the position of the seat and the pedals can be easily changed relative to the fixed handlebars.

It is another purpose of the present invention to provide a bicycle in which the change in position of the seat and the pedals relative to the fixed handlebars can be accomplished by the rider while riding on the bicycle.

Further purposes and advantages of this invention will appear as the description proceeds.

SUMMARY OF THE INVENTION

The present invention overcomes the difficulties of the prior art by providing a mechanism for adjusting the positional relationship between the handlebars and the pedals and seat of the bicycle. The mechanism can be easily activated by the rider while sitting on the seat of the bicycle and while in motion. This feature allows the rider to achieve optimal configuration for any type of terrain and to adjust the configuration as the conditions change.

The present invention is directed towards providing a bicycle with adjustable orientation of the seat and the pedals with respect to the handlebars in which the rider of said bicycle can change the angle between the profile and the rigid support member while riding said bicycle.

The bicycle of the invention comprises an x shaped frame, which is comprised of a profile and a rigid support member. A hollow pin rotatably connects the profile and the rigid support member to each other and the rider of the bicycle can change the angle between the profile and the rigid support member by activating a tilting mechanism to cause the rigid support member to rotate about the hollow pin. In one embodiment of the bicycle the profile is comprised of two pieces connected by a joint.

The bicycle has at least one tilting mechanism chosen from the group comprised of pistons, mechanical linkages, or disc brakes.

The bicycle further comprises a seat attached to the upper part of the rigid support member, a first toothed-wheel attached to the frame by means of a pin passing through the toothed-wheel and the lower part of the rigid support member. The pin has a crank and pedal attached to each of its ends. A front gear and second toothed-wheel are attached to a pin that passes through the hollow pin located between the seat and the first toothed-wheel.

The bicycle further comprises a mechanism to maintain the orientation of the seat with respect to the ground and can comprise shock absorbers on the front, back, or both wheels.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

Figure 2A:
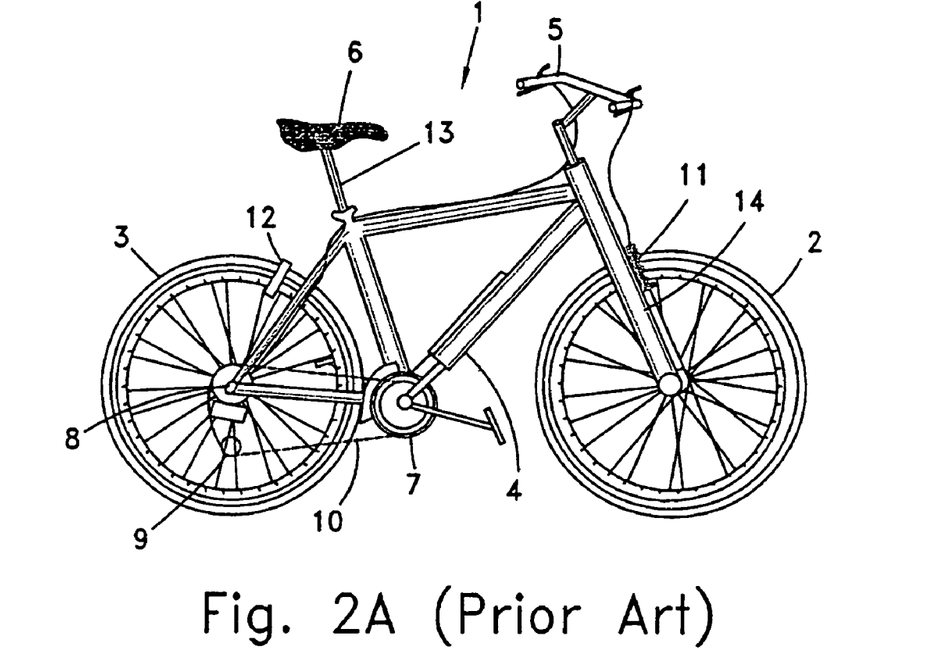
FIG. 2A schematically shows a bicycle typical of the prior art.

FIG. 2A shows a typical prior art bicycle. Bicycle 1 is comprised of a rigid frame made of metal tubes welded together to which is attached the front 2 and back 3 wheels, pedals (with corresponding cranks) 4, handlebars 5, and seat 6. Also shown in FIG. 2A are the front gears (chain wheels) 7, back gears (freewheel) 8, rear derailleur 9, chain 10, and front 11 and rear brakes 12.

Figure 2B:
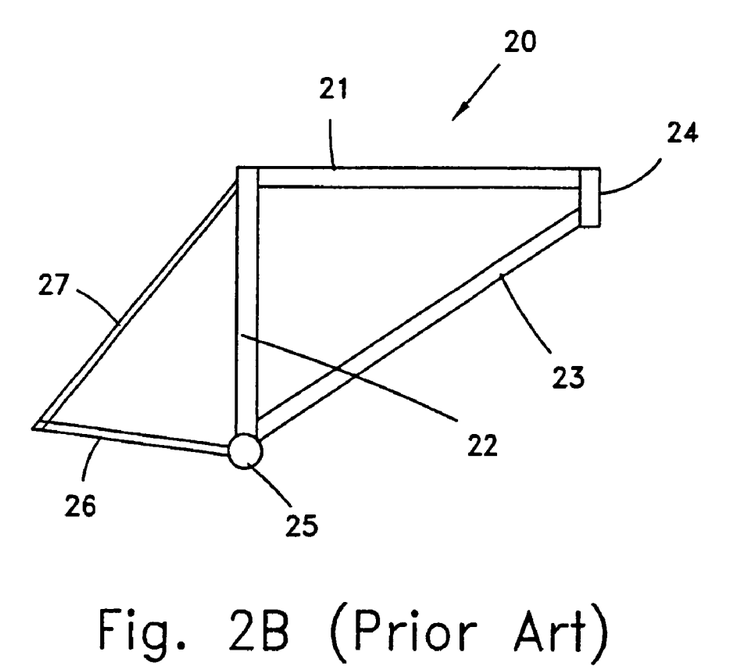
FIG. 2B schematically shows the rigid frame of the bicycle shown in FIG. 2A.

In FIG. 2B is schematically shown the rigid frame 20 of the bicycle shown in FIG. 2A. Frame 20 is comprised of top tube 21, seat tube 22, down tube 23, and head (fork) tube 24. At the back of the frame are two pairs of stays that are attached to the seat tube. The rear wheel fits between the pairs of stays and its axle is attached at each side at the point where the chain stay 26 joins the top stay 27. Also attached at this point, coaxially with the rear wheel, is the rear gear.

It is to be noted that in this specification the word "gear" is used to designate either a single gear or a set of gears that are designed and operate according to principles well known in the art.

The seat (saddle) 6 of the bicycle is normally attached to a short tube 13 that slides into the top of the seat tube 22 and can be raised or lowered and clamped in place to adjust the height of the seat, relative to the ground and pedals, to accommodate the size of the rider. At the bottom of the seat tube, where it is welded to the down tube and chain stays, is welded the bottom bracket 25. The bottom bracket is a short piece of tube welded in a direction orthogonal to the plane in which the other tubes constituting the frame are located. Front gears 7 are attached coaxially with the bottom bracket and a shaft passes through the gears and the bottom bracket to connect the crank and pedal on either side of the bicycle.

At the front of the bicycle 1, the fork 14 to which the front wheel is attached fits into the head tube 24. The handlebars 5 are attached to a short tube 15 (in a similar manner to and for the same purpose as the tube 13), which fits into the top of the head tube.

Figure 3:
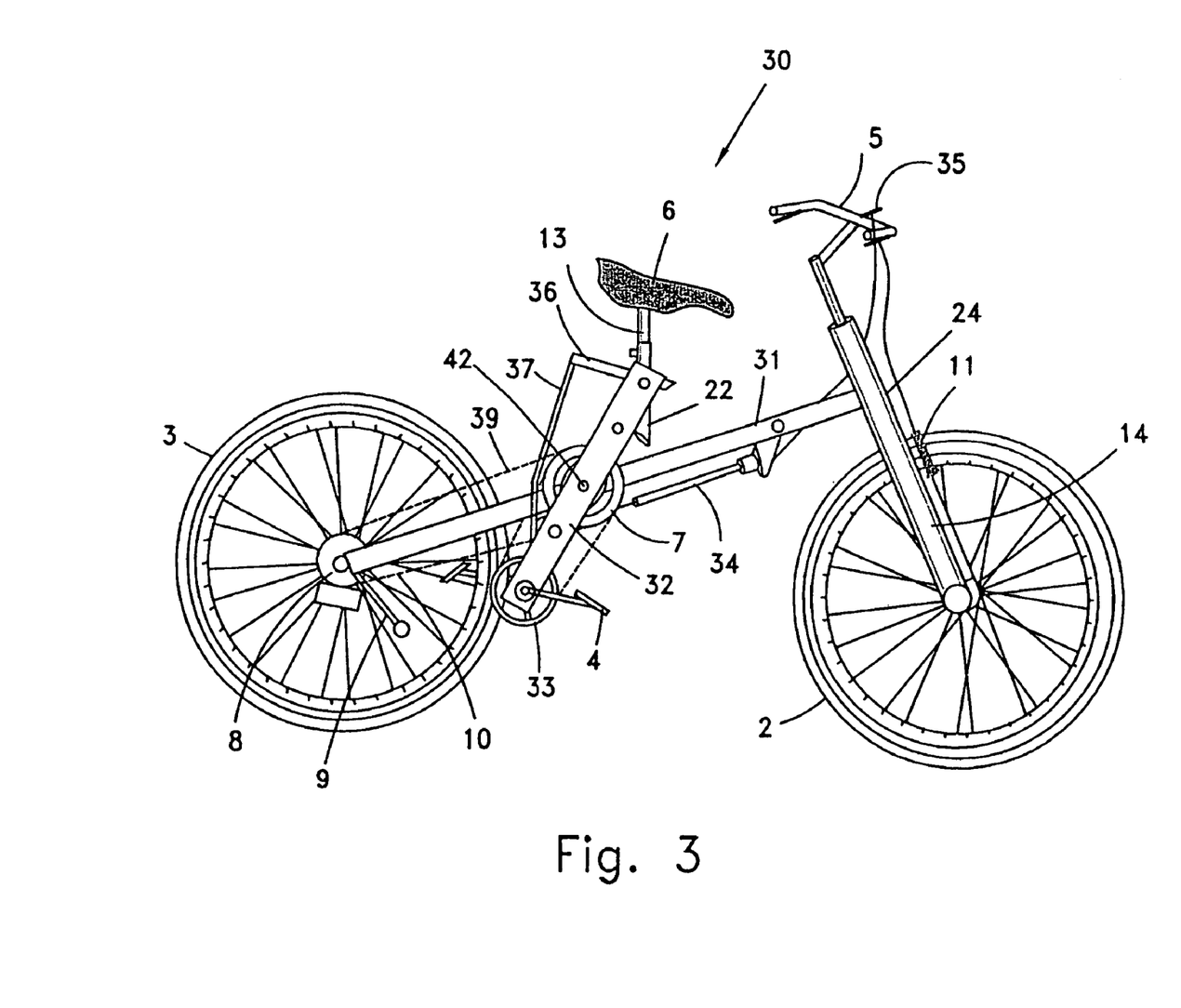
FIG. 3 shows an embodiment of the bicycle of the invention.

FIG. 3 shows an embodiment of the bicycle of the invention. The frame 20 of the bicycle of FIGS. 1 and 2 is replaced, according to the invention, by an x shaped frame, hereinafter an x-frame, composed of a profile 31 and rigid support member 32. A hollow pin 42 about which the rigid support member can rotate relative to the profile connects the two elements of the frame. Ball bearings are provided surrounding the pin to make the motion easier and smoother. The rider can change the angle between profile 31 and rigid support member 32, while riding the bicycle, by means of tilting mechanism 34, which is activated by means of lever 35 located on the handlebars 5.

In another embodiment, the profile 31 is not made of a single piece but comprises two pieces connected with a joint between them. Hollow pin 42 passes through the joint to attach the two-piece profile to the 31 to the rigid support member 32. One advantage of this embodiment is that the bicycle can be broken down into a very small, convenient to handle unit for shipping and storage.

The front gear 7 has been raised to a position below the seat and higher than the rear gear 8. The front gear is mounted on the x-frame by means of a pin that passes through the hollow pin connecting the two elements of the frame. In this way, the tension on the chain 39 that connects the front and back gears of the bicycle remains constant, even as the seat is moved closer to or further away from the handlebars. The front gear is rotated by means of a chain 38 which connects it to toothed-wheel 33 attached to the bottom of rigid support member 32. The axle of wheel 32 is connected to the cranks and pedals of the bicycle. It is to be noted that, as mentioned hereinabove, the front gear can comprise either a single toothed wheel or a complete set of gears as in conventional bicycles. Another advantage of this arrangement is that the toothed wheel can have a relatively small diameter allowing the seat to be closer to the ground while still maintaining sufficient distance between chain and ground.

Profile 31 is welded at the front end to a head tube as in a conventional bicycle. The rear portion of the profile is formed into a fork just before the rear wheel. The wheel fits between the tines of the fork and its axle, as well as the rear gears are attached to the tines by conventional means.

Embodiments of the bicycle of the invention can be provided that comprise shock absorbers on the front, back, or both wheels. The embodiment described hereinabove that comprises the "two piece" profile is especially well suited to be fitted out as a full suspension bicycle. Suitable suspension systems are neither shown in the figures nor further described herein since their use is widespread and their design well known to skilled persons.

Figure 4:
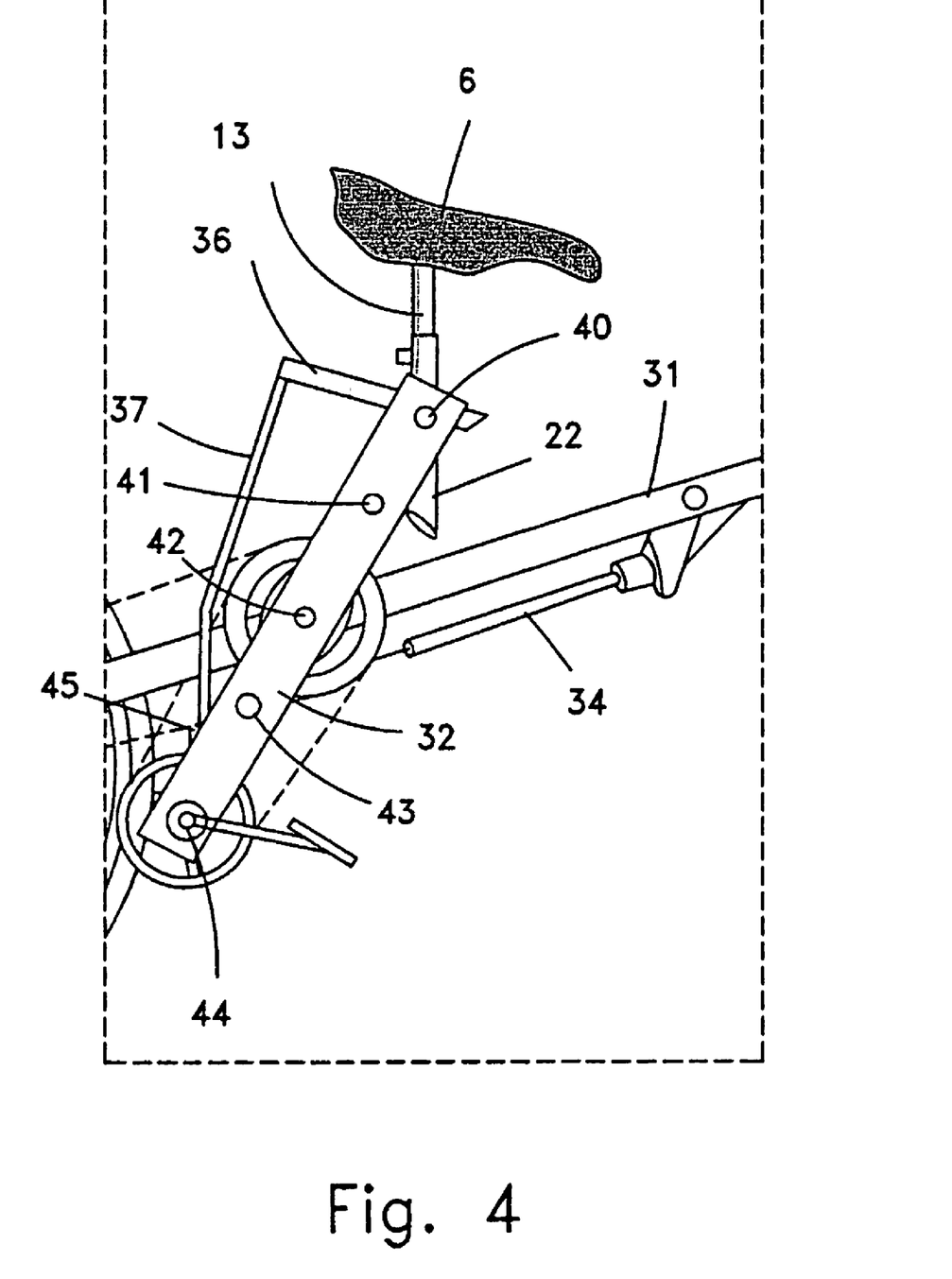
FIG. 4 is an enlarged view of the center portion of FIG. 3.

In the embodiment of the invention described herein, rigid support member 32 consists of two elongated rectangular plates, one on each side of the bicycle, that when fastened together in the manner that will be described hereinbelow with reference to FIG. 4 gives support to and maintains the positional relationship between toothed-wheel 33, front gear 7, pedals 4, and seat 6. In other embodiments of the invention, the entire x-frame is constructed of metal tubes. Skilled persons will be able design other embodiments using different shapes and materials to create the elements of the x-frame.

FIG. 4 is an enlarged view of the center portion of FIG. 3. The seat is attached to pipe 13, which slides up and down inside seat tube 22 and can be moved up and down and locked, as in prior art bicycles, in the position most suitable for the rider. The seat tube can tilt around pin 40a as the angle between profile 31 and rigid support member 32 is changed. Pin 41 holds the two plates that comprise rigid support member 32 rigidly together. Arms 36 and 37 constitute a mechanism that keeps the seat steady and also, by pivoting around pins 40a, 40b, and 40c maintains its orientation with respect to the ground, regardless of the angle between profile 31 and rigid support member 32. One end of tilting mechanism 34 is attached to the rigid support member by means of pin 43. The axle of the toothed wheel described above is represented by numeral 44.

Figure 5:
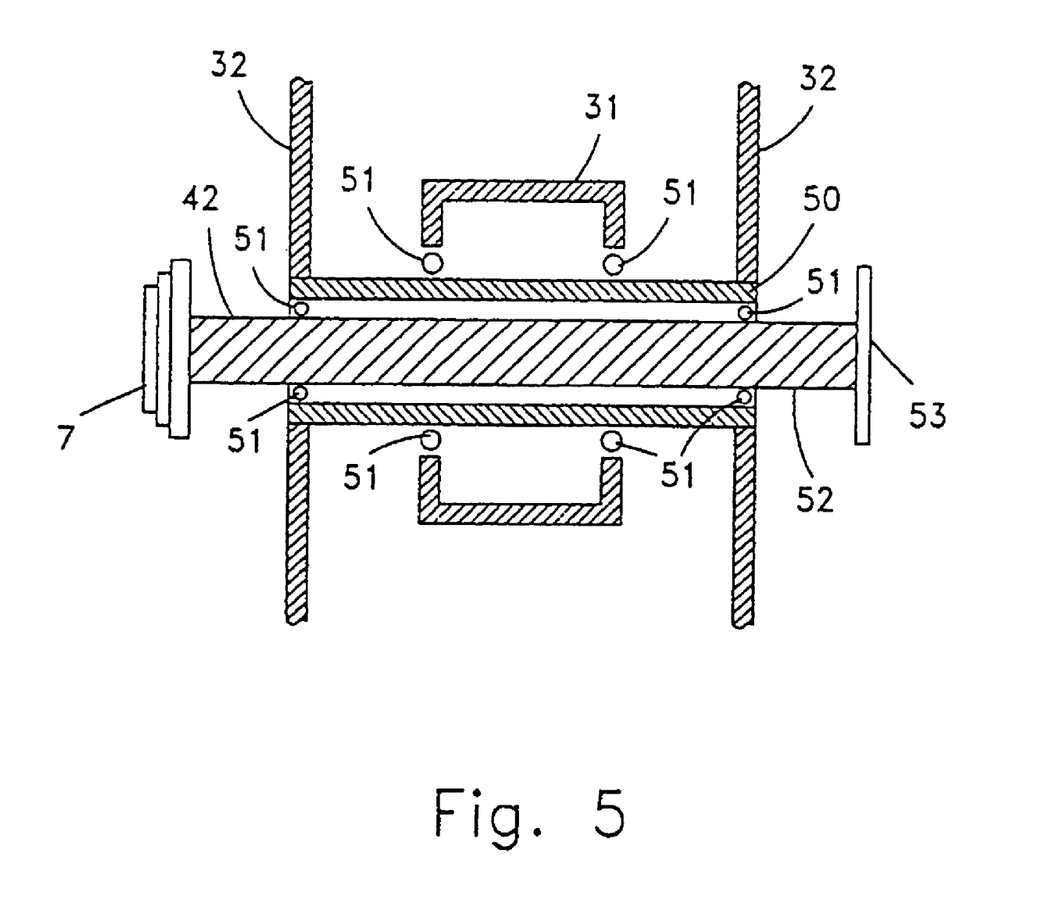
FIG. 5 is a cross-sectional view schematically showing the connection of the elements of the x-frame and how the front gears are attached to the frame and connected to the pedals.

FIG. 5 is a cross-sectional view in a plane perpendicular to that of FIG. 4 and passing through pin 42. In FIG. 5 is schematically shown the connection of the elements of the x-frame and how the front gears are attached to the frame and connected to the pedals. Hollow pin 50 fits into holes bored through rigid support member 32 and profile 31. The pin is rigidly attached to the rigid support member, bearings symbolized by the balls 51 are placed between the inner wall of the hole in the profile and the outer surface of the pin and thus rigid support member 32 can be rotated relative to the profile.

Through the hollow center of pin 50 is inserted pin 42. In the embodiment shown, the front gear 7 is attached at one end of pin 42 and a toothed-wheel 53 is attached to the other end on the opposite side of the frame. In another embodiment, the front gear and toothed-wheel are attached to the pin on the same side of the frame. Bearings 51, are added to reduce friction.

Referring to FIGS. 3 and 5, it can be seen how the power is transferred from the pedals to the rear wheel. Rotating the lower toothed-wheel 33 causes chain 38 to move which causes the upper toothed-wheel 53 to rotate along with pin 42 and front gears 7. The rotation of the front gears is transferred to the rear gears 8 in the conventional manner by chain 39.

The preferred tilting mechanism is a single piston arrangement as shown in FIG. 3. The mechanism consists of a cylinder, which is sealed at both ends and contains a piston connected to a rod. The end of the rod passes through one end of the cylinder. Inside the cylinder there is a compressed gas on one side of the piston and a liquid (usually hydraulic oil) on the other side. The compressed gas pushes the piston, and its attached rod, in the direction of the liquid side until the pressure on both sides of the piston are equal. A reservoir connected through a valve is attached to the liquid side of the cylinder and liquid can be released from the cylinder by opening the valve or can be forced back into the cylinder from the reservoir. As shown in FIG. 3, one end of the cylinder is attached to the profile and the end of the piston rod is attached to the rigid support member. By use of the lever on the handlebars, oil is allowed to drain from the cylinder and thus the compressed gas pushes the piston rod out, causing the rigid support member to rotate around pin 42, pushing the seat forward and the pedals backwards. Pushing against the handlebars will cause the seat to move back and also provide the force needed to cause oil to enter the cylinder thus balancing the gas pressure and preventing rotation of the rigid support member, i.e. locking the seat in position. A further advantage of this type of piston is its self-adjusting property allowing it to act as a shock absorber when sudden forces are applied.

Figure 6:
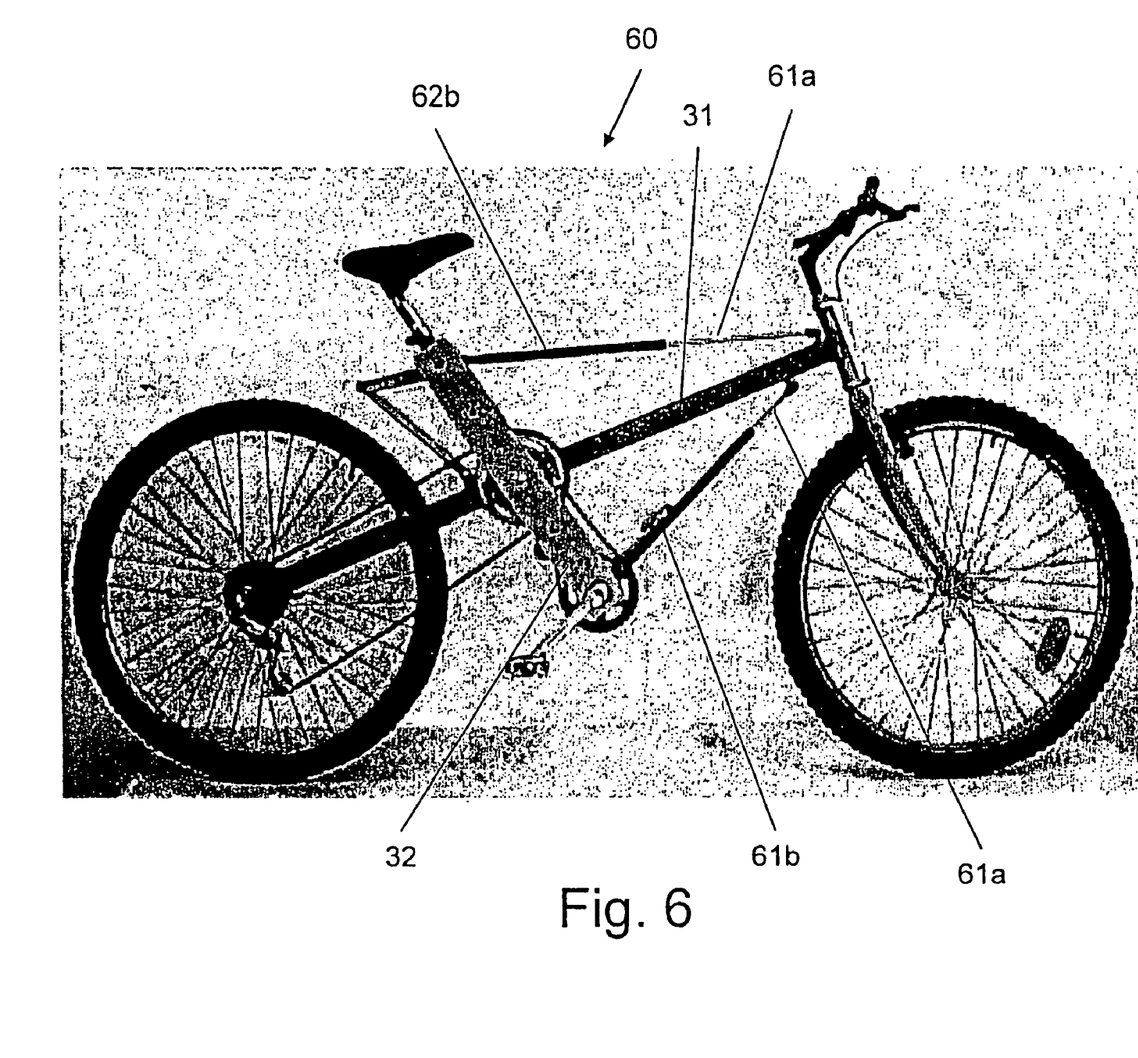
FIG. 6 is a photograph showing an embodiment of the invention.

FIG. 6 is a photograph showing another embodiment of the bicycle of the invention 60. In this embodiment, the tilting mechanism consists of two pistons. One end of piston 61b is attached to the bottom side of profile 31, near its front end, and one end of cylinder 61a is attached near the bottom of rigid support member 32, close to the pedals. A second piston 62b is attached to the top side of the profile 31, near its front end, and cylinder 62a close to the top of rigid support member 32. The two pistons are activated by a single mechanism and act in a push-pull manner to change the angle between profile 31 and rigid support member 32.

It should also be noted, as was pointed out hereinabove, the pistons can be operated in a "float" mode in which case the rider changes his orientation relative to the handlebars by simply leaning forward or backwards on the seat. Other mechanisms, such as mechanical linkages or a disk brake mounted on pin 42 coaxially with the front gear can be used as the tilting mechanism.

Figure 7:
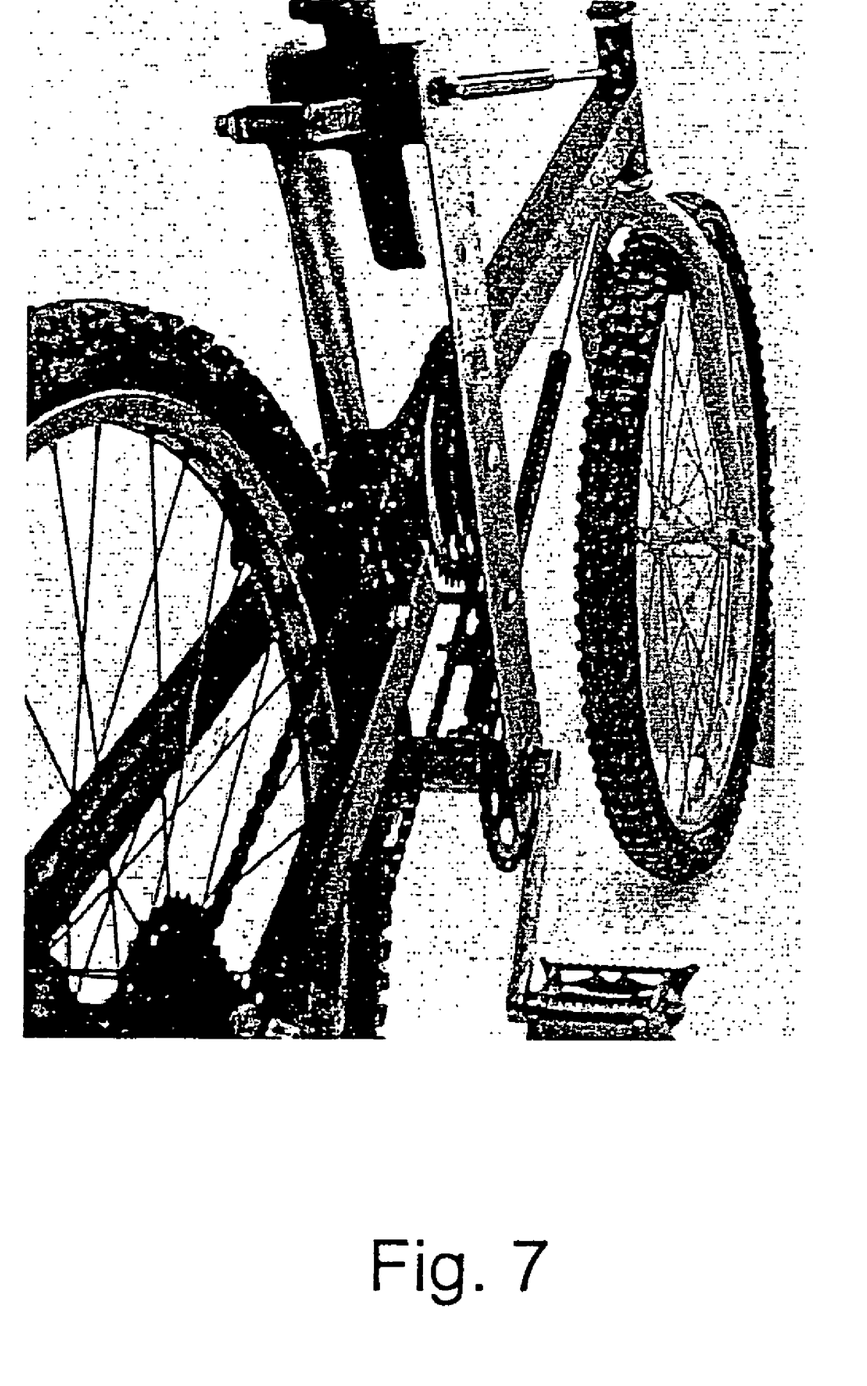
FIG. 7 is a photograph shot from the rear of the bicycle of FIG. 6.

FIG. 7 is a photograph shot from the rear of the bicycle of FIG. 6 showing the arrangement of gears, toothed wheel, and chains that make up the transmission of the bicycle of the invention and described hereinabove.

Figure 8:
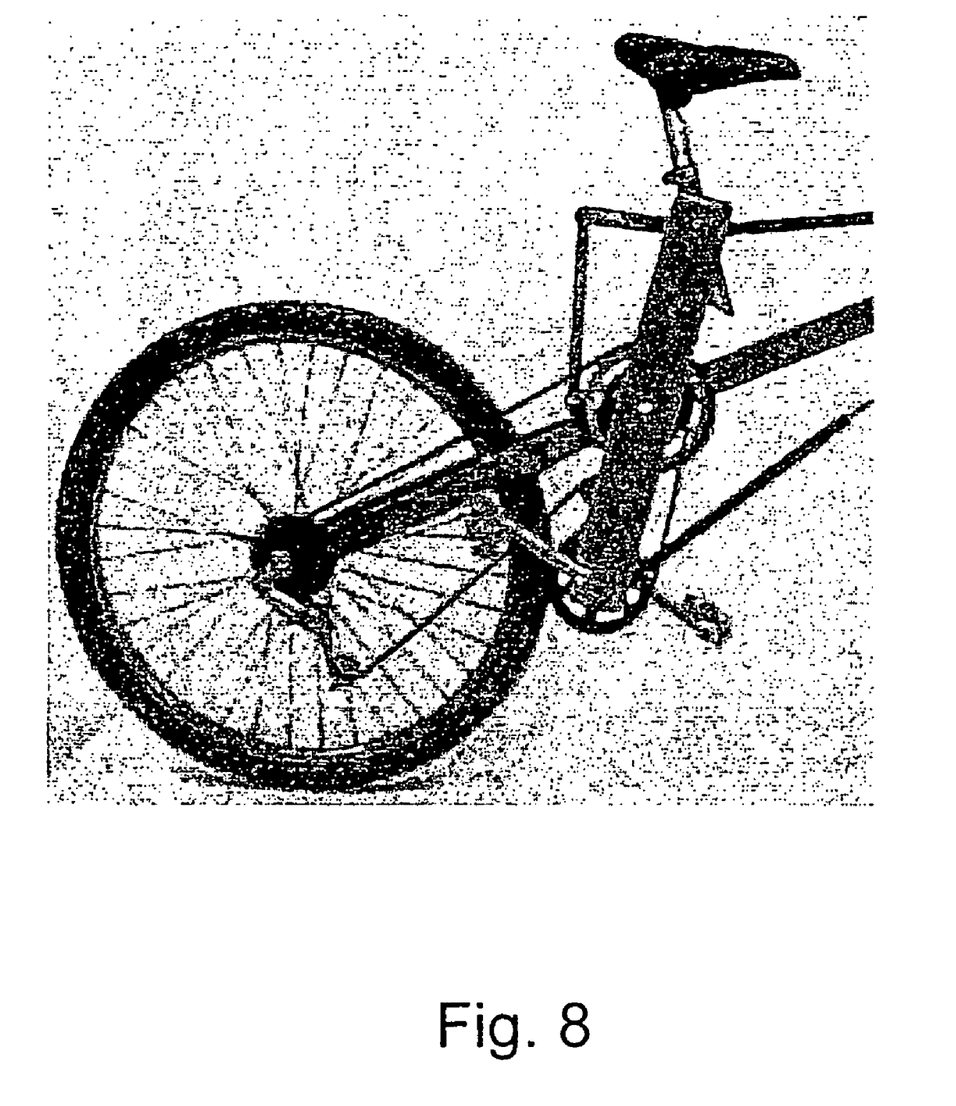
FIG. 8 is a photograph shot from the side showing part of the bicycle shown in FIG. 6.

FIG. 8 is a side view showing part of the bicycle shown in FIG. 6. In FIG. 8, the angle between profile 31 and rigid support member 32 is such that the seat is forward of the front gears and the pedals behind, thus allowing the rider to generate maximum power while still comfortably seated. This is the position that corresponds to situations in which the rider would stand up on the pedals of a prior art bicycle. In FIG. 6, the position of the elements is reversed and the rider is "sitting back" in the seat for a "leisurely" ride.

Although embodiments of the invention have been described by way of illustration, it will be understood that the invention may be carried out with many variations, modifications, and adaptations, without departing from its spirit or exceeding the scope of the claims.

The invention claimed is:

1. A bicycle with adjustable orientation of the seat and the pedals with respect to the handlebars for aiding the rider to maintain the forward motion of the bicycle comprising an x shaped frame, said frame comprised of a profile and a rigid support member, wherein said profile and said rigid support member are rotatably connected to each other by a hollow pin and wherein the rider of said bicycle can change the angle between said profile and said rigid support member by activating a tilting mechanism to cause said rigid support member to rotate about said hollow pin, said bicycle further comprising a seat attached to the upper part of said rigid support member, a first toothed-wheel attached to said frame by means of a pin passing through said toothed-wheel and the lower part of said rigid support member, said pin having a crank and pedal attached to each of its ends, and a front gear and second toothed-wheel attached to a pin that passes through said hollow pin located between said seat and said first toothed-wheel.

2. A bicycle according to claim 1, wherein the profile is comprised of two pieces connected by a joint and the pin that connects said profile and the rigid support member passes through said joint.

3. A bicycle according to claim 1, wherein the rider of said bicycle can change the angle between the profile and the rigid support member while riding said bicycle.

4. A bicycle according to claim 1, wherein the rider of said bicycle can change the angle between the profile and the rigid support member by actuating at least one tilting mechanism chosen from the group comprised of pistons, mechanical linkages, or disc brakes.

5. A bicycle according to claim 1, further comprising a mechanism to maintain the orientation of the seat with respect to the ground.

6. A bicycle according to claim 1, further comprising shock absorbers on the front, back, or both wheels.

* * * * *